Figure 1:
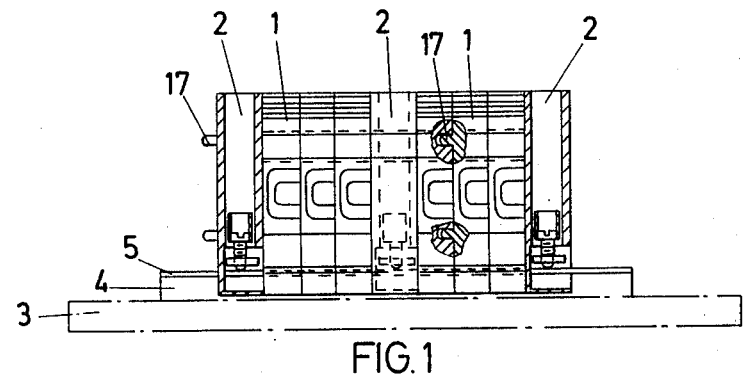

United States Patent [19]

Glaesel

[11] 4,018,502
[45] Apr. 19, 1977

[54] TERMINAL BLOCK RETAINING MEMBER

[75] Inventor: Gottfried Glaesel, Ascona, Switzerland

[73] Assignee: Hego Electric G.m.b.H., Spielhof, Switzerland

[22] Filed: June 25, 1975

[21] Appl. No.: 590,162

[30] Foreign Application Priority Data

Oct. 1, 1974 United Kingdom ............ 42548/74

[52] U.S. Cl. ........................................ 339/198 GA
[51] Int. Cl.² ........................................ H01R 9/16
[58] Field of Search .... 339/198 R, 198 G, 198 GA; 248/223–225, 226, 228

[56] References Cited

UNITED STATES PATENTS

| 3,263,129 | 7/1966 | Glassman | 339/198 GA |
| 3,850,301 | 11/1974 | Flenige | 339/198 GA |
| 3,942,857 | 3/1976 | Hennemann | 339/198 GA |

FOREIGN PATENTS OR APPLICATIONS

| 672,066 | 2/1939 | Germany | 339/198 GA |
| 1,115,803 | 10/1961 | Germany | 339/198 GA |
| 168,938 | 4/1934 | Switzerland | 339/198 GA |
| 920,357 | 3/1963 | United Kingdom | 339/198 GA |

Primary Examiner—Roy Lake
Assistant Examiner—Neil Abrams
Attorney, Agent, or Firm—Pollock, Vande Sande & Priddy

[57] ABSTRACT

A retaining member for use with clip-on terminal blocks comprising a body, with a foot portion which is adapted to rest on a plane supporting surface and is provided with a recess for engaging one edge of an outwardly flanged channel-section supporting rail or of a supporting bar, a clamping screw in the body, a clamping member positively engaged by the screw and capable of being moved thereby between positions for respectively engaging under and disengaging from the other edge of a said rail or bar, whereby the retaining member can be fitted to and removed from the rail or bar by movement transversely to the rail or bar, and a bore extending through the foot portion and accessible from outside the body for receiving a screw for screwing the body to a said plane supporting surface.

7 Claims, 5 Drawing Figures

U.S. Patent    April 19, 1977    4,018,502

TERMINAL BLOCK RETAINING MEMBER

The present invention relates to retaining members for terminal blocks of the kind comprising a plurality of assembled single-pole or multi-pole individual terminal units.

It is now very common to use terminal blocks of the kind which are assembled from a plurality of generally slab-shaped individual terminal units, e.g. the well known "KLIPPON" AKS terminals, mounted side by side. Blocks of this kind are mounted on a support rail, for example a flanged channel-section support rail according to DIN 46 277, or on a plane base, for example on the wall of a control cabinet. In order to ensure reliable and firm seating of the entire terminal block on the aforementioned base or support rail, it is common practice to fix retaining members, commonly called end clamps, at the beginning and end of a row of, and/or between, terminal units so that the entire block is immovably secured.

The individual terminal units are in general open on one large side, for insertion of the terminal components during assembly. It is therefore convenient if the retaining member serves also to close off such open sides. The terminal units are in general provided with shaped foot portions for engaging support rails, and detent springs for releasably retaining the terminal unit on a support rail. The terminal units can therefore be clipped onto and unclipped from a support rail by movement perpendicular to the rail.

The supporting rails are in general of two standard types, both of channel section; one type has inwardly turned flanges to hold the terminal units and is of asymetrical cross section; the other has outwardly turned flanges and is in general of symmetrical cross section. In addition, it is sometimes convenient to be able to mount terminal units or retaining members on bus bars of solid cross section, in general of thin rectangular cross section.

Existing retaining members are somewhat inconvenient and in particular can be attached to and removed from a supporting rail or bar only by being slid therealong, in contrast to the terminal units which are attached and detached by movement perpendicular to the rail or bar. This is extremely inconvenient especially if the retaining member is, or is to be, disposed between adjacent terminal units.

An object of the present invention is to provide a retaining member which can be fitted to and removed from a supporting rail or bar by movement perpendicular thereto.

The present invention resides in a retaining member for use with terminal blocks of the kind hereinbefore referred to, which member comprises a body, with a foot portion which is adapted to rest on a plane supporting surface and is provided with a recess for engaging one edge of an outwardly flanged channel-section supporting rail or of a supporting bar, a clamping screw in the body, a clamping member positively engaged by the screw and capable of being moved thereby between positions for respectively engaging under and disengaging from the other edge of a said rail or bar, whereby the retaining member can be fitted to and removed from the rail or bar by movement transversely to the rail or bar, and a bore extending through the foot portion and accessible from outside the body for receiving a screw for screwing the body to a said plane supporting surface.

Preferably, the body is a generally slab-shaped insulating member, which can serve to close off the open sides of terminal units.

In one embodiment of the invention, the clamping member is slidable transversely to the supporting bar or rail and has a recess (formed, e.g., by a hooked portion) facing the first mentioned recess for engaging the said other edge of the rail or bar, and the clamping screw is threaded in the clamping member adjacent to the recess of the latter, to serve as a handle for sliding the clamping member, and also for clamping the rail bar between the tip of the screw and the clamping member. In this embodiment, the clamping member conveniently extends past the said bore, being, e.g., provided with an aperture or recess to leave the bore unobstructed. The body may be open on one side, or may contain a slot giving access to the said bore and clamping screw.

In a second embodiment of the invention, the clamping member is a nut threaded on the clamping screw, the axis of which extends obliquely relative to the axis of the said bore and converges therewith in the direction away from the foot portion. The angle between the nut and screw forms a recess facing the first mentioned recess and by rotation of the screw the nut, and hence this second recess, can be moved laterally relative to the rail or bar to clamp or release the edge of the latter. This has the advantage that a standard nut and screw can be used.

Figure 2:
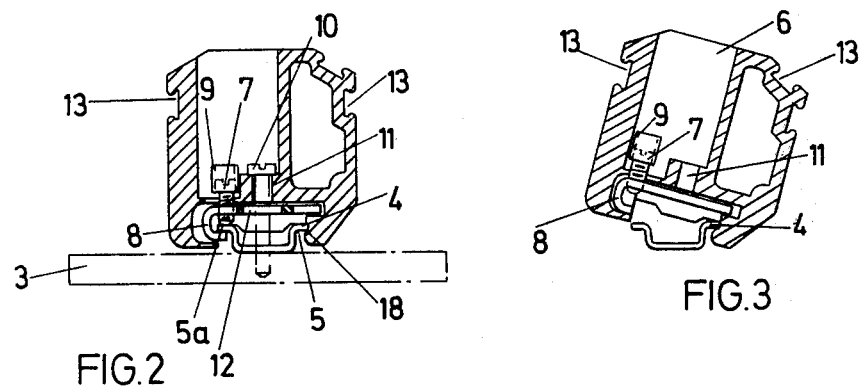
Figure 3:
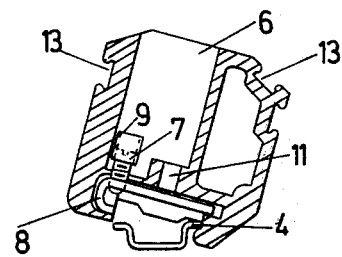
Figure 4:
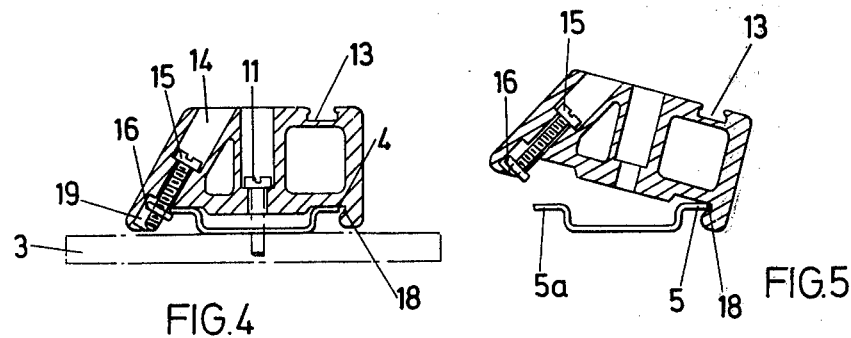
Figure 5:
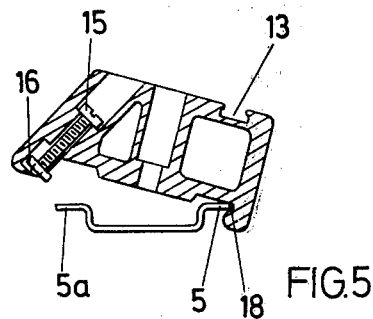

The invention will be further described with reference to the accompanying drawings, in which:

FIG. 1 shows a terminal block including retaining members according to a first embodiment of the invention;

FIGS. 2 and 3 are sectional elevations showing a retaining member as shown in FIG. 1, in the clamped and unclamped positions, respectively; and FIGS. 4 and 5 are views corresponding to FIGS. 2 and 3 of a second form of retaining member.

FIG. 1 shows a terminal block consisting of a plurality of single-pole (or multi-pole) terminal units 1 each of generally slab-like overall form, mounted side by side between retaining members 2, a further retaining member 2 being interposed in the terminal block. The terminal block can be mounted on a channel-section supporting rail 4 with outwardly turned flanges (FIGS. 2 and 3) or on a plane supporting base 3 shown in phantom. The retaining members have insulating plastic bodies corresponding in profile and thickness to the terminal units so that the two types of component can be readily interchanged. The terminal units and retaining members may have lateral projections 17 and mating recesses so that the terminal block is effectively a single unit.

The body of the retaining member has a foot portion which can if desired rest on the plane base 3. The foot portion has limbs which embrace the supporting rail 4 and one of these limbs has a lateral recess 18 for engaging one edge 5 of the rail 4 so that the retaining member can be pivoted about this edge, as can be seen in FIG. 3.

A clamping slide 8 is housed in the foot portion and has a hooked end defining a recess facing the recess 18. The arrangement is such that, when the retaining member is fitted over a supporting rail 4, the hook portion of the clamping slide 8 can be slid into engagement under the other edge region 5a of the supporting rail as shown in FIG. 2, or can be slid clear of the rail edge as shown in FIG. 3. The upper part of the clamping slide, adjacent to the hook portion, has a threaded hole in which is threaded a clamping screw 7 so placed that it can clamp the edge region 5a of the supporting rail between the tip of the screw and the tip of the hook of the clamping slide as shown in FIG. 2.

The head of the clamping screw projects into a slot 6 in the body of the retaining member and has a guide sleeve 9. The guide sleeve serves to receive and retain a screwdriver blade, so that the clamping screw can be used as a handle for sliding the clamping member between the engaged position shown in FIG. 2 and the disengaged position shown in FIG. 3.

Since the clamping slide can be moved completely clear of the edge of the supporting rail, the retaining member can be fitted to and removed from the supporting rail by pivoting about the edge region 5 and recess 18, as shown in FIG. 3, e.g. by movement perpendicular to the rail.

The clamping slide can also be used to secure the retaining member on a flat bus bar (e.g., an earthing bus) of thin rectangular cross section, the recess 18 and the hook of the slide engaging opposite edges of the bar.

The foot portion of the body also contains a through bore 11 for receiving a screw 10 so that the retaining member can be screwed onto the plane supporting base 3. The bore 11 is parallel to the screw 7 and is also accessible through the slot 6. The clamping slide extends past the bore 11 and has an aperture or recess 12 so as not to obstruct the bore.

The body has in each narrow side and upper face a recess 13 for insertion of marking plates or tabs.

The retaining member shown in FIGS. 4 and 5 again has an insulating body with a foot portion containing a recess 18 for engaging one edge of the supporting rail 4, and a bore 11 to receive a screw for fixing the retaining member to the plane base 3. However, in this embodiment the clamping member is a simple nut 16 threaded on a clamping screw 15 received in a bore 14 which extends obliquely relative to the bore 11 and converges with the latter in the direction away from the rail or base 3. The nut 16 is received in a groove 19 in the foot portion of the body with stops at the ends of the groove to limit the movement of the nut. In one end position of the nut, shown in FIG. 5, the nut is clear of the edge 5a of the supporting rail 4 when the other edge of the rail is in engagement with the recess 18, and hence in this position of the nut the retaining member can be fitted to or removed from the rail by pivoting about the edge 5 and recess 18. The groove 19 also serves to prevent rotation of the nut. Consequently, if the clamping screw 15 is rotated counterclockwise, the nut will be drawn towards the upper end of the groove 19 and is thereby moved closer to the recess 18. The angle between the nut and the screw, on the side of the nut facing the screw head, effectively forms a second recess facing the recess 18 and movable towards and away from the latter by rotation of the clamping screw. Consequently the underside of the edge region 5a of the support rail can be gripped by the nut as shown in FIG. 4 so that the retaining member is held on the rail. The clamping screw is received in and accessible through the oblique second bore 14.

I claim:

1. A retaining member for mounting on an elongate supporting member having two opposite outwardly directed edges, for retaining against longitudinal movement electrical terminal blocks mounted on the supporting member, which retaining member comprises a body, with a foot portion provided with a pair of recesses facing one another for engaging respective edges of the supporting member, a clamping screw in the body, with its axis generally transverse to the plane of an edge of the supporting member, a clamping member positively engaged by the clamping screw, defining at least one side of a first said recess and capable of being moved by means of the clamping screw toward and away from the other said recess for respectively engaging under and disengaging from one edge of the supporting member when received by its other edge in the other recess, whereby when the clamping member is disengaged the retaining member can be fitted to and removed from the supporting member by movement of the retaining member transversely to the supporting member, the clamping member being slidable in the body toward and away from the other recess and incorporating the first said recess, and the clamping screw being threaded in the clamping member adjacent to the first said recess for sliding the clamping member and clamping the supporting member between the screw tip and the clamping member.

2. A retaining member as in claim 1, wherein the foot portion has adjacent to the recesses coplanar surfaces capable of resting on a plane supporting surface, and a bore extending through the foot portion and accessible from outside the body for receiving a fixing screw for alternatively screwing the body to a said plane supporting surface.

3. A retaining member as claimed in claim 2, in which the clamping member extends past the said bore.

4. A retaining member as claimed in claim 2, in which the body is generally slab-shaped and contains a slot giving access to the said bore and clamping screw.

5. A retaining member as claimed in claim 1, in which the head of the clamping screw has a guide sleeve for receiving a screwdriver blade.

6. A retaining member for mounting on an elongate supporting member having two opposite outwardly directed edges, for retaining against longitudinal movement electrical terminal blocks mounted on the supporting member, which retaining member comprises a body, with a foot portion provided with a pair of recesses facing one another for engaging respective edges of the supporting member, a clamping screw in the body, with its axis generally transverse to the plane of an edge of the supporting member, a clamping member positively engaged by the clamping screw, defining at least one side of a first said recess and capable of being moved by means of the clamping screw toward and away from the other said recess for respectively engaging under and disengaging from one edge of the supporting member when received by its other edge in the other recess, whereby when the clamping member is disengaged the retaining member can be fitted to and removed from the supporting member by movement of the retaining member transversely to the supporting member, the clamping member being a non-rotating nut threaded on the clamping screw and the axis of the clamping screw extending obliquely relative to the said edge plane, whereby a said edge can be engaged in said first recess formed by the angle between the nut and the screw.

7. A retaining member as in claim 6, wherein the foot portion has adjacent to the recesses coplanar surfaces capable of resting on a plane supporting surface, and a bore extending through the foot portion and accessible from outside the body for receiving a fixing screw for alternatively screwing the body to a said plane supporting surface.

* * * * *